A. W. DICKERSON.
MUD GUARD FOR VEHICLES.
APPLICATION FILED NOV. 13, 1913.
1,094,134.
Patented Apr. 21, 1914.
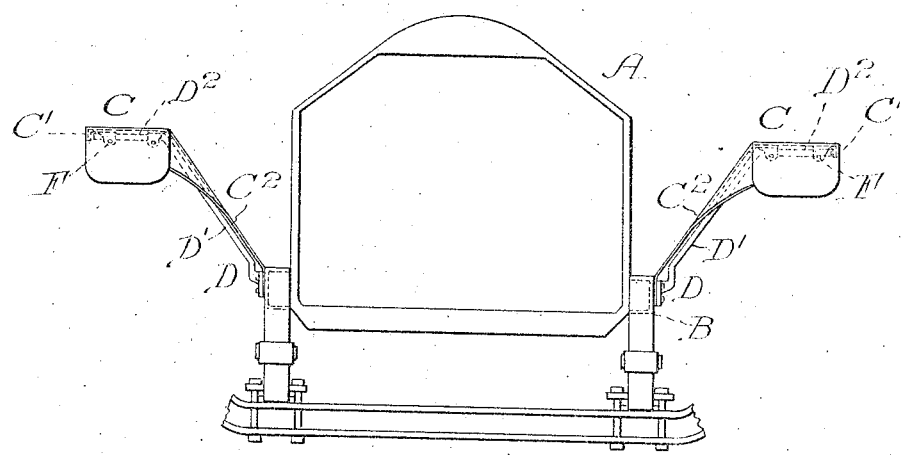
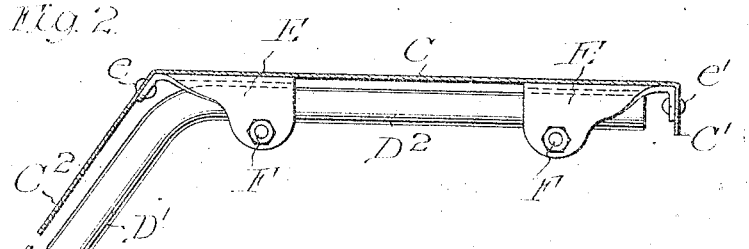
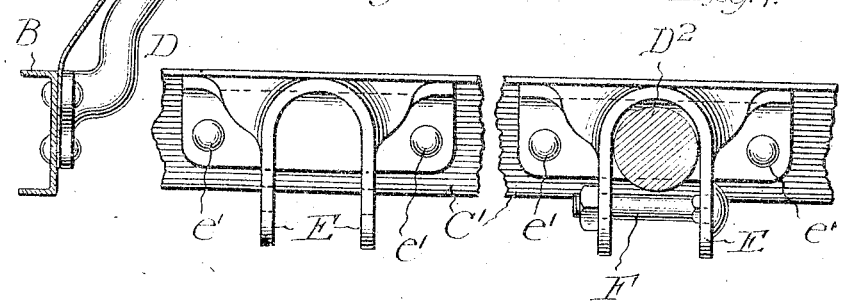
Witnesses
E. R. Barrett
Grace E. Wynkoop
Inventor
Augustus W. Dickerson
By L. E. Thomas
Attorney

UNITED STATES PATENT OFFICE.

AUGUSTUS W. DICKERSON, OF DETROIT, MICHIGAN, ASSIGNOR TO DETROIT AUTO SPECIALTY CO., OF DETROIT, MICHIGAN, A CORPORATION OF MICHIGAN.

MUD-GUARD FOR VEHICLES.

1,094,134.

Specification of Letters Patent.

Patented Apr. 21, 1914.

Application filed November 13, 1913. Serial No. 300,703.

*To all whom it may concern:*

Be it known that I, AUGUSTUS W. DICKERSON, citizen of the United States, residing at Detroit, county of Wayne, State of Michigan, have invented a certain new and useful Improvements in Mud-Guards for Vehicles, and declare the following to be a full, clear, and exact description of the same, such as will enable others skilled in the art to which it pertains to make and use the same, reference being had to the accompanying drawings, which form a part of this specification.

My invention relates to mud guards for vehicles, shown in the accompanying drawings and more particularly set forth in the following specification and claim.

Heretofore it has been customary to rivet or bolt the mud guard of an automobile to its supporting fender iron by bolts or rivets engaging these parts but on account of the head of the bolts marring the appearance of the top of the guard it has lately become the practice to attach the guard to the fender iron by bolts projecting through the apron, and through the stiffening rib, in order that the top of the guard may present the desired smooth unbroken appearance. The objection to the latter course is that it becomes necessary to shape the fender iron very accurately, in order to conform to the angle of the stiffening rib, top, and apron of the guard, involving considerable labor, time and expense as it is frequently necessary to grind the fender iron in order to provide an accurate fit. A further objection is that the attaching bolts when adjusted and under tension to insure the necessary rigidity between the parts, often indent the apron and stiffening rib where the bolt passes through these parts causing the apron and stiffening rib to present a rough, uneven or wavy surface. It is therefore the object of the present invention to overcome these several objections by providing the mud guard with suitable clips riveted or otherwise engaged to its stiffening rib and to the apron, by means of which the guard is secured to the fender iron. By constructing the guard with the clips attached it may be enameled before engaging it to the supporting fender iron and thus the guard may be handled much more readily and with better results in enameling. By my construction considerable time and labor may also be saved in the manufacture of the fender iron as it need not be shaped with the same degree of accuracy as has heretofore been necessary in order to adapt it for the attachment of the guard, or to provide for the proper alinement of the parts.

Other advantages and improvements will hereafter appear.

In the drawings accompanying this specification:—Figure 1 is a fragmentary front elevation of an automobile showing the mud guard in position. Fig. 2 is a cross-sectional view through the mud guard attached to the fender iron, with parts broken away. Fig. 3 is a fragmentary detail of the stiffening rib of the mud guard showing one of the clips attached thereto. Fig. 4 is a like view indicating the guard attached to the fender iron which is shown in cross-section.

Referring to the letters of reference placed upon the drawings:—A indicates an automobile; B its frame; C a mud guard; C' its stiffening rib; and C² the apron, the lower end of which is secured to the frame.

D indicates a fender iron bolted or otherwise secured to the frame having an angular extension D' conforming to that of the apron and having a horizontal extension D² conforming to the top of the guard.

E, E, are clips straddling the horizontal extension of the fender iron and respectively riveted at $e$ to the apron and at $e'$ to the stiffening rib of the guard.

F are lateral bolts engaging the walls of the clip, by adjusting which the guard may be secured to the fender iron.

Having indicated the several parts by reference letters, the construction and operation of the device will be readily understood.

It will be apparent as previously indicated, that in the present construction it is not essential that the fender iron should exactly conform to the angles of the walls of the mud guard, as the mud guard may be readily adjusted, easily alined, and secured to the fender iron by means of the clips without the necessity of accurately fitting the parts, thereby saving time, labor and expense.

Having thus described my invention, what I claim is:—

In a device of the class described, a mud guard provided with an apron and stiffening rib, clips respectively secured to the apron and stiffening rib adapted to embrace a fender iron, the fender iron, and means for securing the clips to the fender iron.

In testimony whereof, I sign this specification in the presence of two witnesses.

AUGUSTUS W. DICKERSON.

Witnesses:
GRACE E. WYNKOOP,
SAMUEL E. THOMAS.